Figure 2:
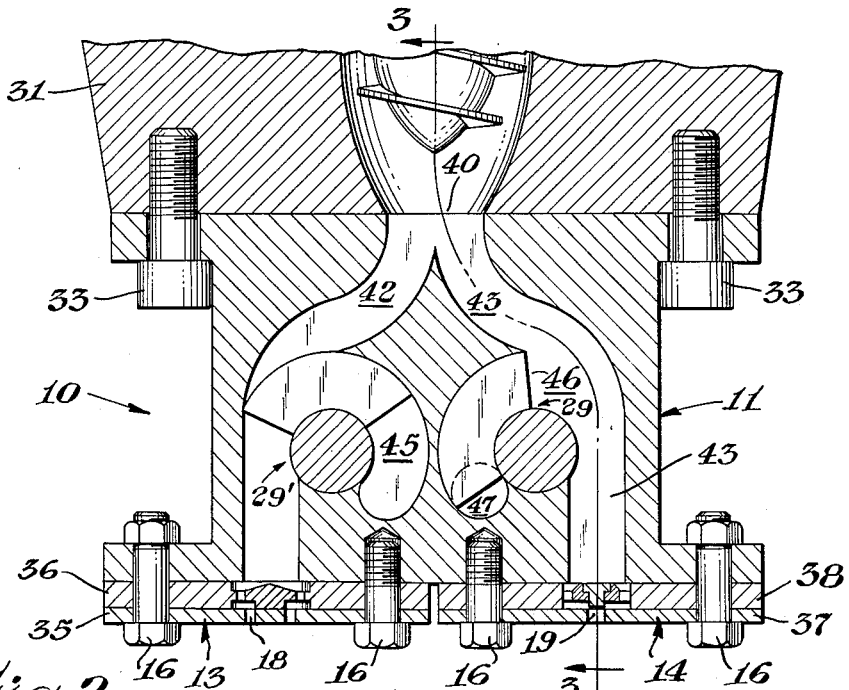

July 31, 1962     I. S. HOUVENER     3,046,602

EXTRUDING APPARATUS

Filed May 2, 1960     2 Sheets-Sheet 1

INVENTOR.
Irving S. Houvener
BY
AGENT

July 31, 1962     I. S. HOUVENER     3,046,602
EXTRUDING APPARATUS

Filed May 2, 1960     2 Sheets-Sheet 2

INVENTOR.
Irving S. Houvener
BY Robert Behnke
AGENT

United States Patent Office 3,046,602
Patented July 31, 1962

3,046,602
EXTRUDING APPARATUS
Irving S. Houvener, Midland, Mich., assignor to The Dow Chemical Company, Midland, Mich., a corporation of Delaware
Filed May 2, 1960, Ser. No. 26,121
6 Claims. (Cl. 18—12)

This invention relates to an apparatus for simultaneously extruding two separate and independent shapes. The invention is specifically directed to a multiple die-head for a single extruder wherein there is provided non-fouling valves for flow control of the extrude to the die openings.

In the past a single extruder has been employed to feed a plurality of openings in a die-head such as are encountered in the melt spinning of fibers. It has been very difficult to obtain a uniform product from such a multiopening die. Various constriction and deflection arrangements have been used to control the flow of fluid extrude to the individual die orifice. These have employed either constriction means with adjustments that were inaccessible while the extruder was in operation, or externally controlled valve arrangements which are readily fouled by the material being extruded, or caused undesirable dead spots in the internal flow pattern. Dead spots within an extruder are generally disadvantageous, particularly in instances where thermoplastic synthetic resinous materials are extruded. Excess inventory time within such an apparatus results in the thermal decomposition of the material extruded. Such decomposition will often result in bubbles or discoloration of the product, due to undesirable carbon residues resulting from the decomposition of the resin.

It is an object of this invention to provide an extruder head which permits the individual control of the flow of material to each extrusion orifice.

It is a further object of this invention to provide a non-fouling valve arrangement for a multiple orifice die extruding head.

It is yet another object of this invention to provide a mechanically simple and readily machinable individually controlled multiple orifice die-head.

These objects and other benefits may be achieved by employing in an extruding machine for extruding a plurality of parts from a single source of supply the combination comprising a head member, a terminal die plate member, including a plurality of extrusion orifices, each of said extrusion orifices being in communication with said source of supply by means of at least one passageway, each of said passageways having cooperatively associated therewith an adjustable interposable flow restricting portion so constructed and arranged that flow pattern in said passageway is generally streamlined.

Figure 1:
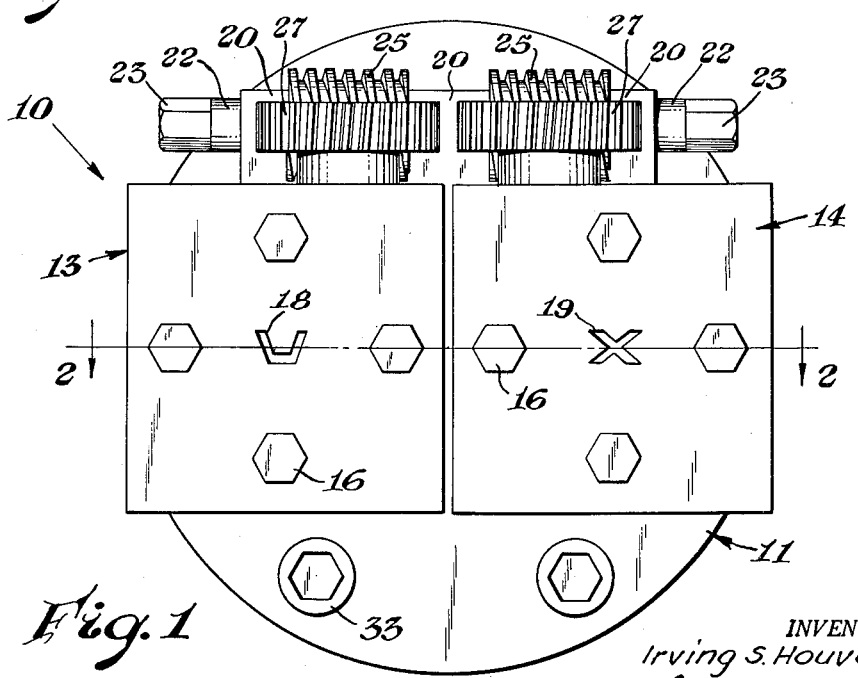
Figure 3:
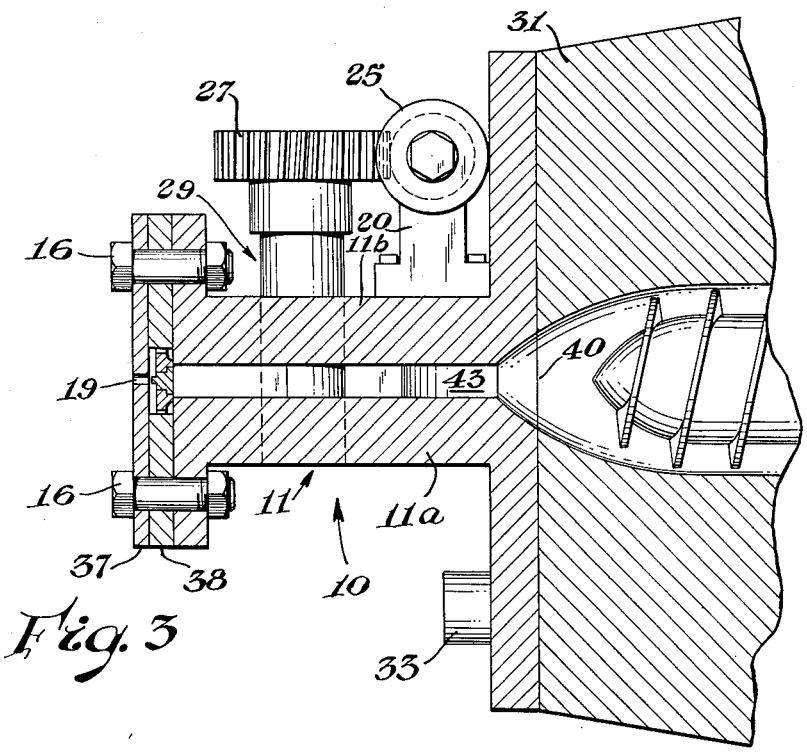
Figures 4, 5:
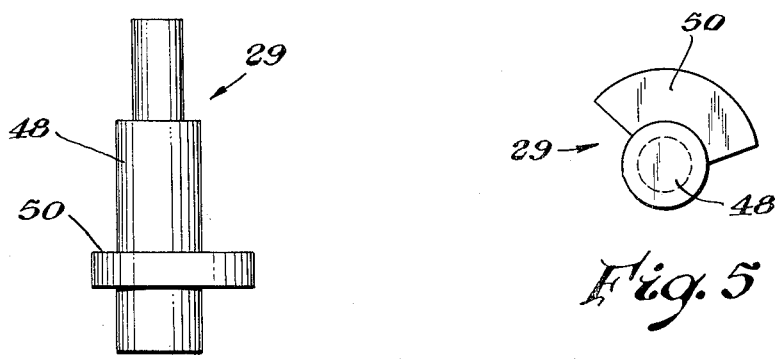

Further objects and advantages of the invention will become apparent from the following description when taken in conjunction with the accompanying drawing wherein:

FIGURE 1 is a front view of a die-head in accordance with the invention;
FIGURE 2 illustrates a cross-sectional view of the die-head of FIGURE 1 taken along the line 2—2;
FIGURE 3 is a cross-sectional view of the die-head of FIGURE 1 taken along one of the feed channels; and
FIGURES 4 and 5 show side and bottom views of a valving member in accordance with the invention.

In FIGURE 1 there is illustrated a front view of a die-head in accordance with the invention generally indicated by the reference numeral 10. The die-head 10 comprises a body 11 carrying two individual die plates 13 and 14. The die plates 13 and 14 are secured to the die body 10 by cap screws 16. The die plate 13 defines an extruding orifice 18, and the die plate 14 defines an extruding orifice 19. Supported on the valve body 11 are bearing blocks 20 which in turn carry shafts 22 fitted with adjusting nuts 23 and worms 25. The worms 25 are in engagement with worm gears 27 which are operatively connected to valving members 29 and 29' (not shown).

In FIGURE 2 there is illustrated a cross-sectional view of the die-head 10 taken along the lines 2—2 of FIGURE 1. The die body 11 is fitted to an extruder 31 by means of cap screws 33. The die plate 13 is comprised of inner plate 36 and outer plate 35 while the die plate 14 is formed from inner plate 38 and outer plate 37. The die body 11 has a common intake port 40 in full communication with two individual passageways 42 and 43 leading to the die orifices 18 and 19 respectively. A valve member 29 is positioned adjacent channel 42 intermediate between the opening 40 and the die orifice 18 in the case of channel 42 and a valving member 29' between intake opening 40 and the die orifice 19 in the case of channel 43. A valving member receiving recess 45 is provided in communication with channel 42, and valving member receiving recess 46 has been provided in communication with channel 43. A clean-out hole 47, optionally, may be provided.

In FIGURE 3 there is a sectional view of the multiple die-head taken along the center line of channel 43 as illustrated in FIGURE 2 more clearly illustrating the relationship of the passageway 43 to the valving member 29 and body halves 11a and 11b.

In FIGURE 4 there is illustrated the valving member indicated generally by the numeral 29 comprising a shaft 48 supporting a gate 50 which is a generally radially mounted cylindrical portion.

In FIGURE 5 there is illustrated a bottom view of the valving member 29 further showing the radial attachment of the shaft 48 to the valving member 50.

The operation of the invention may be readily understood with reference to FIGURE 2. A continuous supply of material is forced into the intake channel 40 where it is then divided between the passageways 42 and 43. The material traveling through the channels 42 and 43 will than be expressed from the die openings 18 and 19. Control of the flow rates from the openings 18 and 19 is readily obtained by partially interposing into the channel or channels the valving members 29 and 29' which may be delivering an excess of material to the die opening.

The external adjusting elements set forth in FIGURES 1 and 3 readily permit the variation of adjustment of the valving members 29 and 29' during an extrusion operation. The gate member 50 having the general form of a cylindrical portion provides a linear flow pattern in the channels 42 and 43 in the open position and at all positions up to the full closed position. Advantageously, the use of the cylindrical portion eliminates the dead areas in extrusion passageways 42 and 43 and thus prevents the formation of decomposition products and residues of the material being extruded, resulting in a channel which is substantially self-cleaning. Under high back pressure, some leakage of material passing the valving member 50 may occur, and this can be readily removed through clean-out port 47. Frequently, the flow characteristics of the extrude are such that clearances between the valving members 29 and 29' and the body 11 will prevent passage of the material being extruded between the two members into channels 45 and 46. In these cases the clean-out port 47 may conveniently be omitted.

In a particular embodiment of the invention illustrated herewith, the channels 42, 43, 45 and 46 have a substantially rectangular cross section. Although this cross section may be varied within the equivalents well known in the art, the rectangular cross section is particularly advantageous in the construction of a die-head in accordance with the invention. The use of a rectangular channel permits the die body to be constructed in two parts and the channels 42, 43, 45, and 46 to be formed by the use of the square end mill. Thus, wear in the valving member 50 may be taken up by facing one of the mating surfaces of the die body, halves 11a and 11b, and upsetting the leading edge of the cylindrical portion 50.

The die-head and valving arrangement may be constructed from any of the conventional materials of construction, such as steel, brass, stainless steel, nickel, and thermoplastic and thermosetting resinous materials, such a choice being predicated on the particular application for which the die-head is to be employed.

As is apparent, the apparatus is susceptible of being embodied with various alterations and modifications from that which has been described in the preceding description and specification. Therefore, it is to be fully understood that all of the foregoing is merely intended to be illustrative and is not to be construed or interpreted as being restrictive or otherwise limiting of the present invention, excepting as it is set forth and defined in the hereto appended claims.

What is claimed is:

1. In an extruding machine for extruding a plurality of parts from a single source of supply, the combination comprising a head member, a terminal die plate member including a plurality of extrusion orifices, each of said extrusion orifices being in communication with said source of supply by means of at least one passageway, each of said passageways having cooperatively associated therewith an individually adjustable interposable flow restricting portion, each of said flow restricting portions having a generally arcuate surface adapted to restrict one of said passageways and maintain within said passageway a flow pattern that is generally streamlined when a flowable material is passed through at any setting of the flow restricting portions lying between closure of said passageways and the least passageway restricting position of said flow restricting portions.

2. The extruding machine of claim 1, wherein the interposable portion is rotatively interposed.

3. The extruding machine of claim 1, wherein the passageways in the head member are a generally rectangular cross section.

4. An extruding machine of claim 1, wherein the interposable portions are externally controlled.

5. An extruding machine of claim 1, wherein the head member has two passageways.

6. The extruding machine of claim 5, wherein there are two different die openings.

References Cited in the file of this patent

UNITED STATES PATENTS

| | | |
|---|---|---|
| 2,653,352 | Gliss | Sept. 29, 1953 |
| 2,740,989 | Henning | Apr. 10, 1956 |

FOREIGN PATENTS

| | | |
|---|---|---|
| 697,034 | Germany | Oct. 4, 1940 |